US008626920B2

(12) United States Patent
Kadota

(10) Patent No.: US 8,626,920 B2
(45) Date of Patent: Jan. 7, 2014

(54) NETWORK SYSTEM AND PERIPHERAL

(75) Inventor: Masatoshi Kadota, Takahama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 856 days.

(21) Appl. No.: 12/726,011

(22) Filed: Mar. 17, 2010

(65) Prior Publication Data
US 2010/0250749 A1  Sep. 30, 2010

(30) Foreign Application Priority Data

Mar. 26, 2009 (JP) ................................ 2009-076797

(51) Int. Cl.
G06F 15/16 (2006.01)
(52) U.S. Cl.
USPC ......................................... 709/226; 358/1.15
(58) Field of Classification Search
USPC ......................................... 709/226; 358/1.15
See application file for complete search history.

(56) References Cited

U.S. PATENT DOCUMENTS 7,826,080 B2 * 11/2010 Matsumoto et al. ......... 358/1.15
7,840,674 B1 * 11/2010 Sterling ........................ 709/226

2004/0068548 A1  4/2004 Sugita
2004/0148379 A1  7/2004 Ogura
2006/0109505 A1 * 5/2006 Ha et al. .................... 358/1.15

FOREIGN PATENT DOCUMENTS

| JP | 9-73424 A | 3/1997 |
| JP | 11-232233 A | 8/1999 |
| JP | 2001-268306 A | 9/2001 |
| JP | 2004/21582 A | 1/2004 |
| JP | 2004-139572 A | 5/2004 |
| JP | 2007-148629 A | 6/2007 |

OTHER PUBLICATIONS

Kawakami, Yoshio; Machine Translation of JP9073424(A), Mar. 18, 1997 pp. 1-9.*
Japanese Office Action dated Jan. 11, 2011 together with partial English translation.

* cited by examiner

Primary Examiner — Kevin Bates
(74) Attorney, Agent, or Firm — Scully, Scott, Murphy & Presser, P.C.

(57) ABSTRACT

A network system is made up of a plurality of PCs, a printer a server, and the like. The printer selects one PC from among the plurality of PCs as a firmware provider. Accordingly, if there are two or more PCs that can communicate with the printer, only one PC communicates with the server at the same time. Thus, to retrieve firmware from the server, a plurality of PCs can be prevented from communicating with the server at the same time, so that concentration of access to the server can be suppressed. Therefore, an increase in the network traffic can be suppressed.

8 Claims, 12 Drawing Sheets

FIG. 2

| HOST INFORMATION | | | LAST ACCESS TIME ([ms] FROM POWER ON) |
|---|---|---|---|
| IP | PORT | PROTOCOL | |
| 10.134.111.1 | 9100 | LPR | 19803560 |
| 10.134.111.2 | 9100 | LPR | 19803550 |
| 10.134.111.3 | 9100 | LPR | 19753290 |
| 10.134.111.4 | 9100 | LPR | 19801003 |
| 10.134.111.5 | 9100 | LPR | 19802010 |
| | | | |
| | | | |
| | | | |

NETWORK SYSTEM AND PERIPHERAL

CROSS REFERENCE TO RELATED APPLICATION

The present application claims priority from Japanese Patent Application NO. 2009-076797, which was filed on Mar. 26, 2009, the disclosure of which is incorporated herein by reference in its entirety.

BACKGROUND OF THE INVENTION

This invention relates to a network system and a peripheral

Hitherto, a network system including a server, a computer that can communicate with the server through a network, and a peripheral that can communicate with the computer through the network has been known.

In this kind of network system, the computer retrieves the latest firmware of a printer (an example of a peripheral) from the server and transmits the retrieved firmware to the printer, whereby the printer updates the firmware.

SUMMARY OF THE INVENTION

If two or more computers that can communicate with the peripheral exist, there is a possibility that all computers may retrieve the firmware for the server at the same time. In this case, access to server concentrates and thus a problem occurs in that the network traffic (line use state) increases.

In view of the circumstances described above, it is an object of the invention to suppress an increase in network traffic.

In order to achieve the object, a network system according to exemplary embodiments of the invention comprises a server, a plurality of computers that can communicate with the server through a network, and a peripheral that can communicate with the plurality of computers through the network, wherein the server comprises a firmware storage unit which stores a latest firmware, wherein the peripheral comprises:

a selection unit which selects one computer from among the plurality of computers;

a providing request transmission unit which communicates with the computer selected by the selection unit, and transmits a request for providing the latest firmware to the selected computer; and an update unit which updates the firmware of the peripheral, wherein each of the plurality of computers comprises:

a firmware retrieving unit which retrieves the latest firmware stored in the firmware storage unit of the server by communicating with the server upon reception of the providing request from the providing request transmission unit; and a firmware providing unit which provides the latest firmware by communicating with the peripheral transmitting the providing request when the firmware retrieving unit retrieves the firmware, and wherein the update unit of the peripheral updates the firmware of the peripheral to the latest firmware provided by the firmware providing unit.

A peripheral according to exemplary embodiments of the invention connected to and communicating with a plurality of computers that can communicate with a server through a network, the peripheral comprises:

a selection unit which selects one computer from among the plurality of computers;

a providing request transmission unit which communicates with the computer selected by the selection unit, and transmits a request for providing a latest firmware to the selected computer; and an update unit which updates the firmware of the peripheral to the latest firmware provided by the computer receiving the providing request by communicating with the computer receiving the providing request.

A method according to exemplary embodiments of the invention for updating a firmware of a peripheral connected to and communicating with a plurality of computers that can communicate through a network with a server storing a latest firmware, comprises:

selecting one computer from among the plurality of computers by the peripheral;

transmitting a request for providing the latest firmware to the selected computer from the peripheral;

retrieving the latest firmware from the server by the selected computer upon reception of the providing request from the peripheral;

providing the retrieved latest firmware from the selected computer to the peripheral;

updating the firmware of the peripheral to the latest firmware provided by the selected computer.

A peripheral according to exemplary embodiments of the invention comprises;

a communicating unit configured to communicate with a plurality of computers;

a storage unit for storing a firmware; and a controller connected to the communicating unit and the storage unit, wherein the controller selects one computer from among the plurality of computers communicable via the communicating unit, the controller communicates with the one computer to retrieve a firmware from the one computer via the communicating unit, and the controller stores the firmware retrieved from the one computer in the storage unit.

BRIEF DESCRIPTION OF THE DRAWINGS

FIG. 2 is a schematic representation to describe a monitor table stored in a storage unit of a printer of the first embodiment of the invention;

DESCRIPTION OF EXEMPLARY EMBODIMENTS

Exemplary embodiments of the invention will be discussed below with the accompanying drawings:

1. General Configuration of Network System

Figure 1:
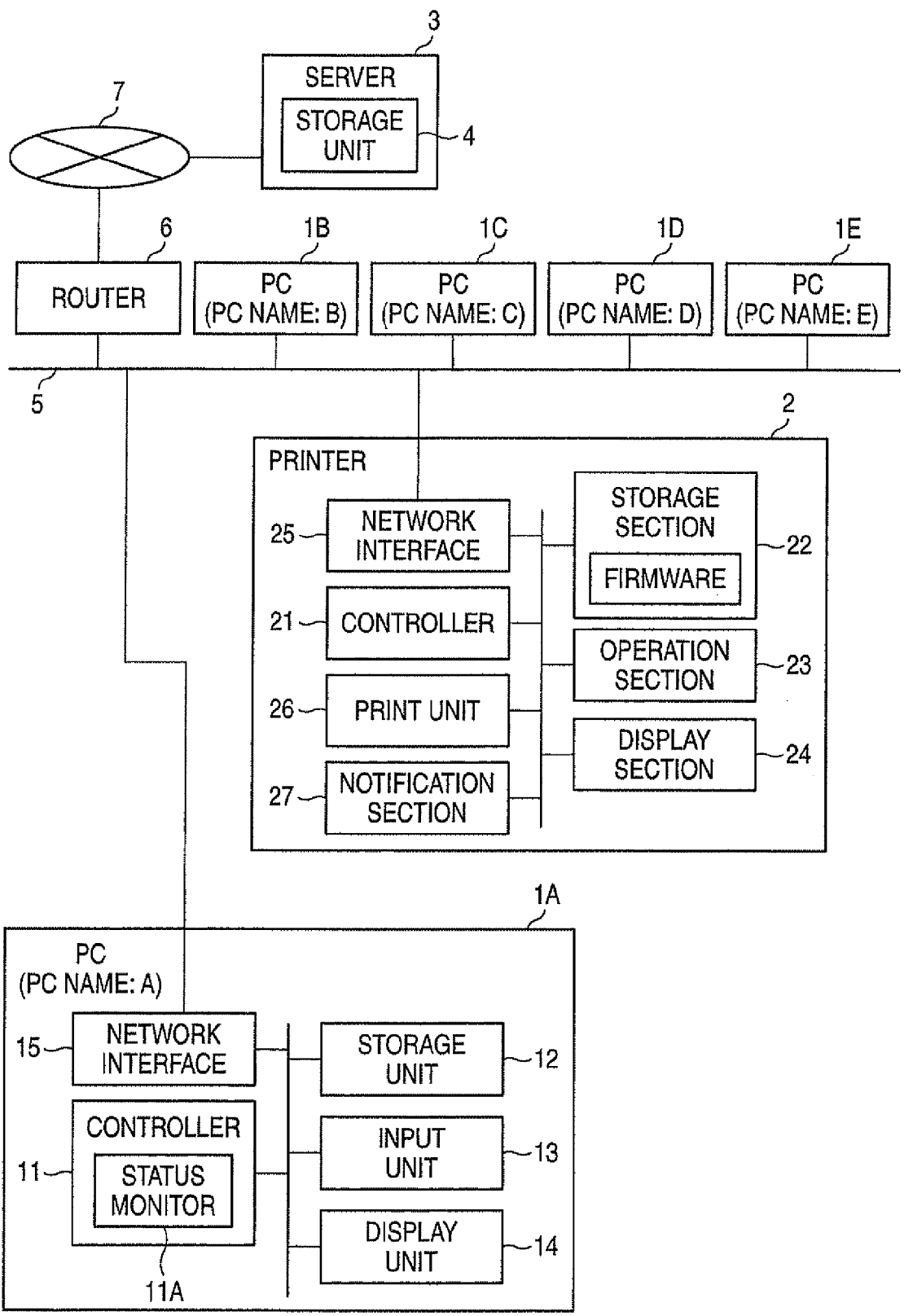
FIG. 1 is a schematic block diagram to represent the general configuration of a network system of a first embodiment of the invention.

A network system is made up of a plurality of computers 1A to 1E (PC 1A to PC 1E), a printer 2, a server 3, and the like as shown in FIG. 1.

The PC 1A to PC 1E and the printer 2 can communicate with each other through a LAN (Local Area Network) 5. The LAN 5 is connected to a WAN (Wide Area Network; for example, the Internet) 7 through a router 6 and the PC 1 can also communicate with the server 3 through the WAN 7.

The server 3 is provided with a function of distributing firmware for the printer 2 and the firmware of the printer 2 to be distributed is stored in a storage unit 4 of the server 3 in association with version information of the firmware.

The PC 1 includes a controller 11, a storage unit 12, an input unit 13, a display unit 14, a network interface 15, and the like.

The controller 11 is made up of hardware of a CPU, RAM, ROM, etc., and software of an OS (Operating System), applications, etc. In the controller 11, a status monitor 11A, purser, and the like function as software relating to the network system.

The status monitor 11A performs processing of outputting status information concerning the printer 2 such as the operation state, the trouble state, the use state, etc., of the printer 2 to the display unit 14, thereby providing the information for the user, processing of retrieving the latest firmware of the printer 2 from the server 3 and providing the retrieved firmware for the printer 2, and the like.

The storage unit 12 is implemented as a hard disk unit and nonvolatile memory. The storage unit 12 is used for storing data of a large size and data to be stored even when power supply is shut off. In the embodiment, the storage unit 12 stores the firmware of the printer 2 retrieved (received) by the PC 1 from the server 3.

In FIG. 1, the internal configuration of only the PC 1A is shown; however, the internal configuration of each of other PC 1B to PC 1E is similar to that of the PC 1A. This also applies to the drawings described later.

The printer 2 prints on an output sheet in accordance with a print command transmitted from the PCs 1A to 1E; it includes a controller 21, a storage unit 22, an operation unit 23, a display unit 24, a network interface 25, a print unit 26, a notification unit 27 for providing notification in the surroundings by producing a sound or light, a clock counter (not shown) for counting time after the printer 2 has turned on in unit of milli second ([ms]), and the like.

The storage unit 22 is implemented as nonvolatile memory and stores firmware for controlling the hardware of the printer 2, information relevant to the firmware, a monitor table including PC monitoring data for monitoring the PC 1A to PC 1E that can communicate with the printer 2, and the like. The information relevant to the firmware is information of the type of firmware, the version information of the firmware, etc.

The monitor table is a table including data for monitoring the PC 1A to PC 1E that can communicate with the printer 2. The monitor table associates host information concerning the PC 1A to PC 1E that can communicate with the printer 2 (in the embodiment, IP address, port number, protocol, etc.) and the last access time at which each of the PC 1A to PC 1E last accessed the printer 2 with each other, as shown in FIG. 2. The last access time is the time at which the printer 2 received a status request command sent from the PC 1A to PC 1E at S520 described later The time is indicated as the count of the clock counter after the printer 2 has turned on.

The controller 21 is implemented as a microcomputer made up of a CPU, RAM, ROM, etc.

Figure 3:
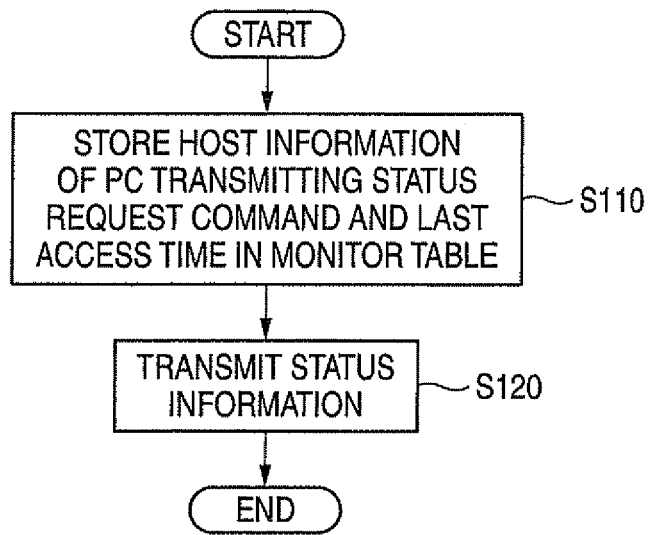
FIG. 3 is a flowchart of status information transmission processing executed by a controller of the printer of the first embodiment of the invention.

Upon reception of a status request command representing a request for status information of the printer 2 from the PC 1A to PC 1E, the controller 21 executes status information transmission processing shown in FIG. 3. FIG. 3 is a flowchart of the status information transmission processing executed by the controller 21.

For example, when the controller 21 of the printer receives the status request command from the PC1A, the controller 21 records, on the monitor table, the PC monitor information including the name of PC (PC1A) which transmitted the status request command and the receiving time of the status request command. Thereafter, the controller 21 transmits the status information of the printer 2 to the PC (PC1A) which transmitted the status request command (S120).

In the same way, when the controller 21 receives the status request command from any of PC1B-PC1E, the controller 21 records, on the monitor table, the PC monitor information including the name of PC which transmitted the status request command and the receiving time of the status request command.

Figure 4:
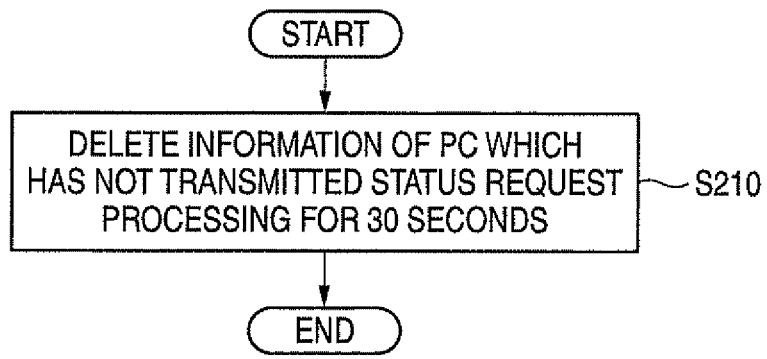
FIG. 4 is a flowchart of registration deletion processing executed by the controller of the printer of the first embodiment of the invention.

The controller 21 periodically (every 10 seconds in the exemplary embodiment) performs registration deletion processing as shown in FIG. 4. The registration deletion processing is a processing of deleting the PC monitor information which is recorded on the monitor table and which has the receiving time which elapses more that 30 seconds from the current time. That is, the controller 21 deletes from the monitor table the PC which has not transmitted the status request command for the 30 seconds as the controller 21 regards this PC as a PC which does not need the status of the printer 2 anymore.

The controller 21 also performs update processing of selecting one PC from among the PC 1A to PC 1E registered in the monitor table, retrieving firmware from the selected PC, and updating the firmware of the printer 2 to the latest firmware (firmware retrieved from the selected PC).

Figure 5:
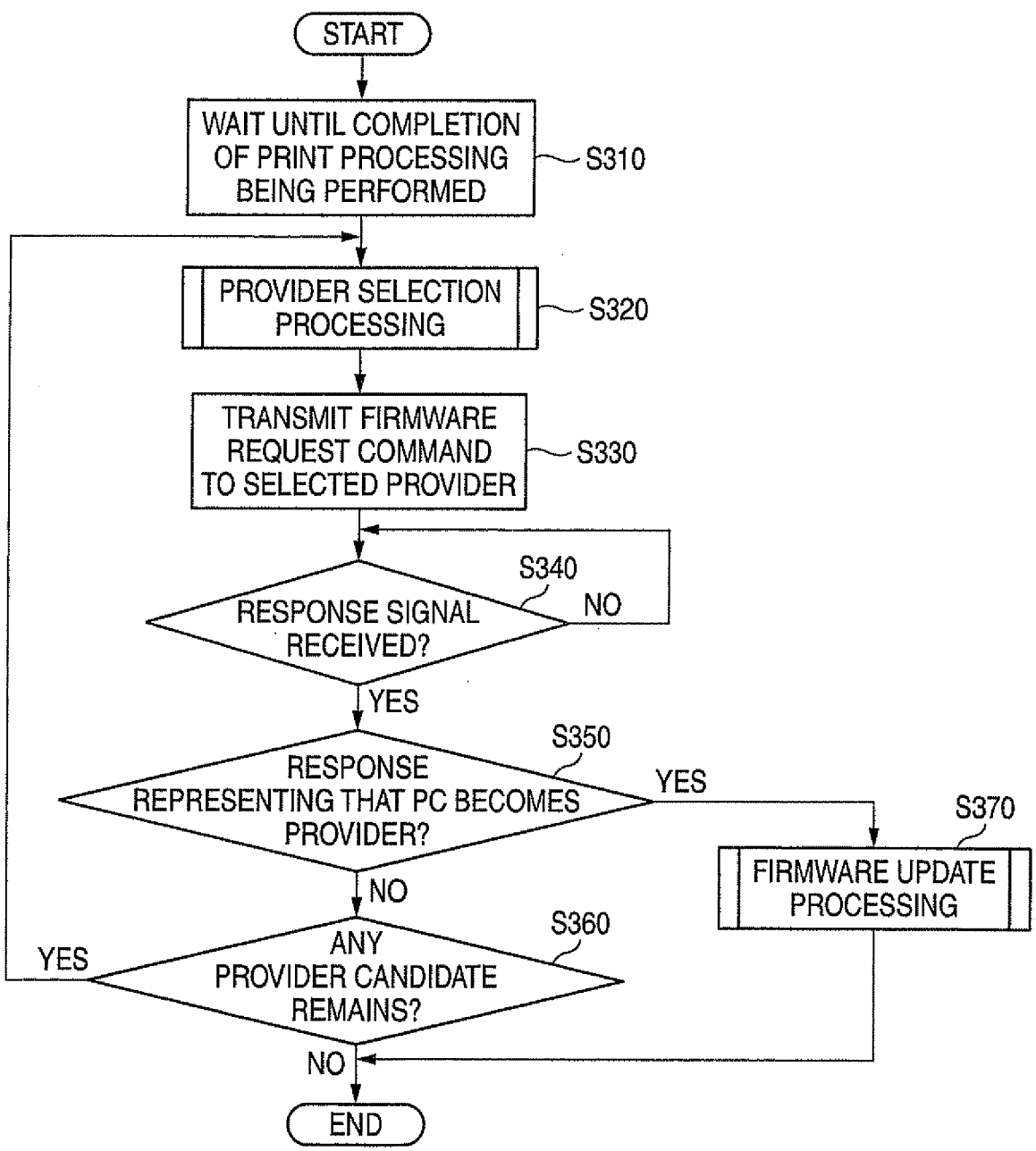
FIG. 5 is a flowchart of update processing executed by the controller of the printer of the first embodiment of the invention.

2. Characteristic Operation of Network System 2.1. Characteristic Operation of Printer 2.1.1. Update Processing FIG. 5 is a flowchart to represent update processing executed by the controller 21 of the printer 2. This processing is executed at regular time intervals (in the embodiment, once a month).

When the controller 21 starts the update processing shown in FIG. 5, first, if a print processing is in progress performing, the controller 21 halts the update processing until the current print processing being completed (S310), as shown in FIG. 5.

When the current print processing is completed, provider selection processing of selecting one PC as the PC of the firmware provider from among the PC 1A to PC 1E registered in the monitor table at S320.

The PC of the firmware provider is a PC for retrieving the firmware of the printer 2 from the server 3 and providing the retrieved firmware for the printer 2. In the description to follow, the case where the printer 2 selects the PC 1A in the provider selection processing is taken as an example.

Subsequently, at S330, a firmware request command representing a request for the latest firmware is transmitted to the PC 1A selected in the provider selection processing and at S340, whether or not a response signal transmitted from the PC 1A as a response to the firmware request command has been received at the printer 2 is determined.

If it is determined at S340 that a response signal is not received (NO at S340), S340 is repeated. On the other hand, if it is determined that a response signal is received (YES at S340), whether or not the response signal received at S340 is a signal representing approval of the PC 1A becoming the provider is determined (S350).

If it is determined at S350 that the response signal is not a signal representing approval of the PC 1A becoming the provider, in other words, that the response signal is a signal representing refusal of the PC 1A becoming the provider (NO at S350), whether or not another provider candidate exists among the PC 1A to PC 1E registered in the monitor table is determined (S360).

A specific example is taken for the description. If it is determined at S350 that the response signal is not a signal representing approval of the PC 1A becoming the provider (NO at S350), the PC 1A selected in the present provider selection processing does not become an provider and thus whether or not any other PC than the PC 1A exists among the PC 1A to PC 1E registered in the monitor table is determined at S360.

If it is determined at S360 that another provider candidate exists (YES at S360), provider selection processing of selecting one PC from among the PC 1B to PC 1E except the already selected PC (here, the PC 1A) is executed (S320); if it is determined that no provider candidate exists (NO at S360), the update processing shown in FIG. 5 is terminated.

If it is determined at S350 that the response signal is a signal representing approval of the PC 1A becoming the provider (YES at S350), firmware is retrieved from the PC 1A selected in the provider selection processing. After the retrieval of the firmware, the firmware of the printer 2 is updated (overwritten) by the retrieved firmware (S370), and the update processing shown in FIG. 5 is terminated.

If the version of the firmware that the printer 2 has at present is already the latest version, the printer 2 does not retrieve firmware from the PC 1A selected in the provider selection processing and terminates the update processing shown in FIG. 5.

2.1.2. Provider Selection Processing

Figure 6:
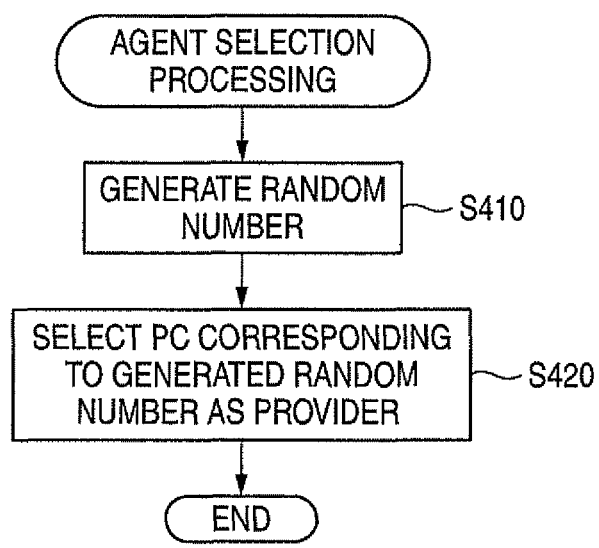
FIG. 6 is a flowchart of provider selection processing executed by the controller of the printer of the first embodiment of the invention.

FIG. 6 is a flowchart to represent the provider selection processing executed by the controller 21 of the printer 2. This processing is executed when S310 of the update processing shown in FIG. 5 terminates. When the controller 21 starts the provider selection processing, random numbers with the number of PCs not transmitting a response signal indicating refusal of the PC 1A to PC 1E becoming the provider as the maximum value are generated (S410).

That is, in the provider selection processing, first, all PCs of the PC 1A to PC 1E registered in the monitor table are provider selection candidates and the PC 1A and 1B refusing to become the provider although selected as the provider (NO at S350) are excluded from the provider selection candidates.

At S420, one PC 1 is selected from among the PC 1A to PC 1E registered in the monitor table based on the result of S410 and the provider selection processing is exited.

Specifically, for example, if the PC 1A only issues a response signal representing refusal of the PC 1A becoming the provider, random numbers of 1 to 4 are generated and the digits 1 to 4 correspond to the PC 1B to PC 1E. If the random number result is 2, the PC 1C corresponding to the digit 2 is selected.

Figure 7:
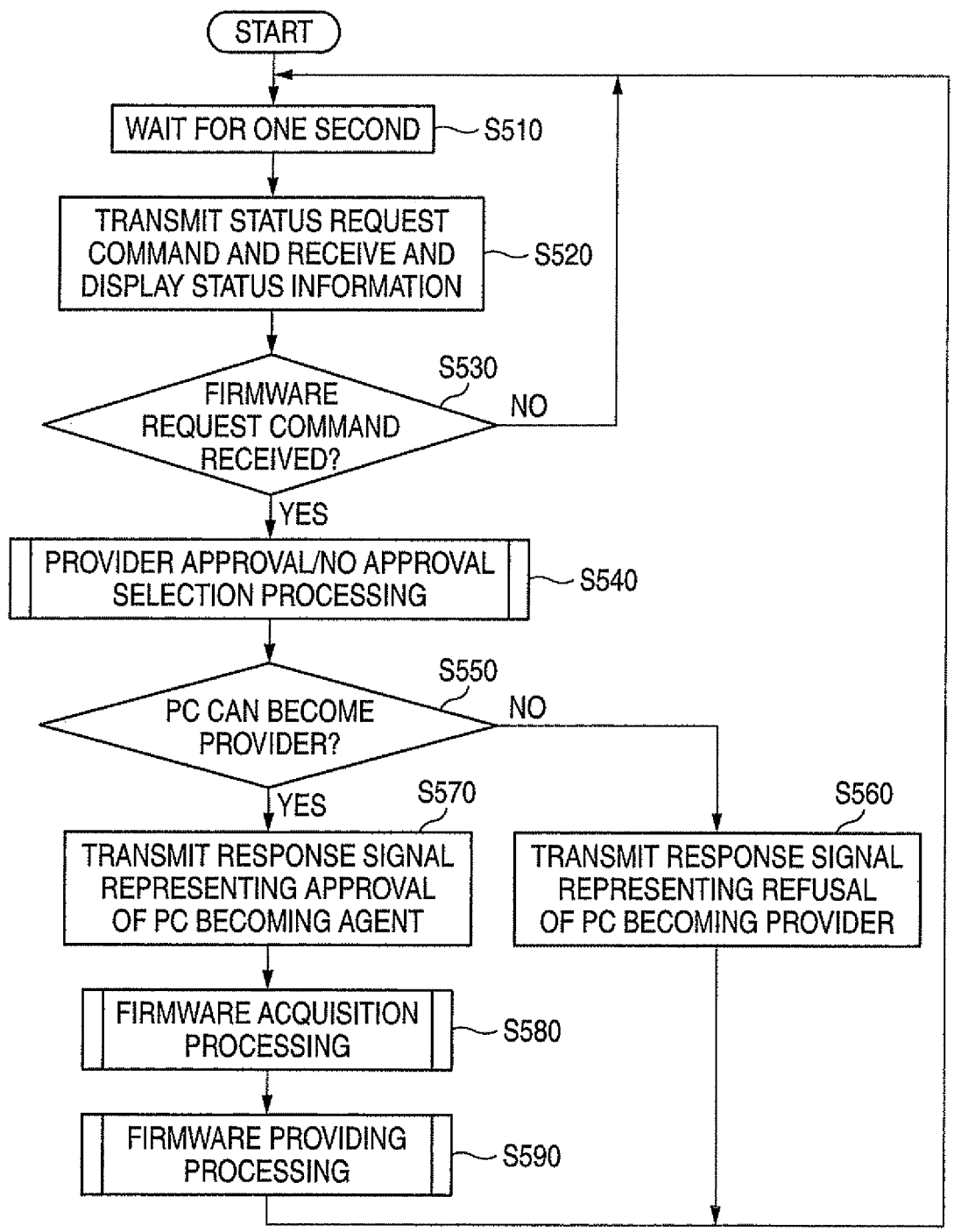
FIG. 7 is a flowchart of processing executed when a status monitor is started in a PC of the first embodiment of the invention.

2.2. Characteristic Operation of PC 2.2.1. Processing Executed by Status Monitor FIG. 7 is a flowchart of processing executed by the controller 11 when the status monitor 11A is started in the PC 1A. When the controller 11 of the PC 1A starts the processing shown in FIG. 7, first, a standby state is held for one second (S510) as shown in FIG. 7.

Next, a status request command is transmitted to the printer 2 and status information transmitted from the printer 2 in response to the command is retrieved and the information is displayed (S520).

Subsequently, at S530, whether or not a firmware request command has been received at the PC 1A is determined. This firmware request command is the command transmitted at S330 in the update processing of the printer 2. If it is determined at S530 that no firmware request command is received (NO at S530), the process returns to S510; if it is determined that a firmware request command has been received (YES at S530), the process goes to S540.

At S540, provider approval/refusal selection processing of examining the use state of the PC 1A and selecting whether or not the PC 1A becomes the provider based on the examination result is executed. At S550, whether or not the PC 1A becomes the provider is determined based on the result of the provider approval/refusal selection processing.

If it is determined at S550 that the PC 1A does not become the provider (NO at S550), a response signal representing refusal of the PC 1A becoming the provider is transmitted to the printer 2 (S560) and the process returns to S510.

On the other hand, if it is determined at S550 that the PC 1A becomes the provider (YES at S550), a response signal representing approval of the PC 1A becoming the provider is transmitted to the printer 2 (S570).

Subsequently, at S580, firmware acquisition processing of retrieving the latest firmware of the printer 2 from the server 3 is executed. At S590, the firmware retrieved at S580 is transmitted to (provided for) the printer 2 and the process returns to S510.

In the firmware acquisition processing (S580), if the version of the firmware that the printer 2 has at present is already the latest version, firmware is not retrieved from the server 3. Likewise in the firmware providing processing (S590), if the version of the firmware that the printer 2 has at present is already the latest version, firmware is not provided for the printer 2.

2.2.2. Provider Approval/Refusal Selection Processing

Figure 8:
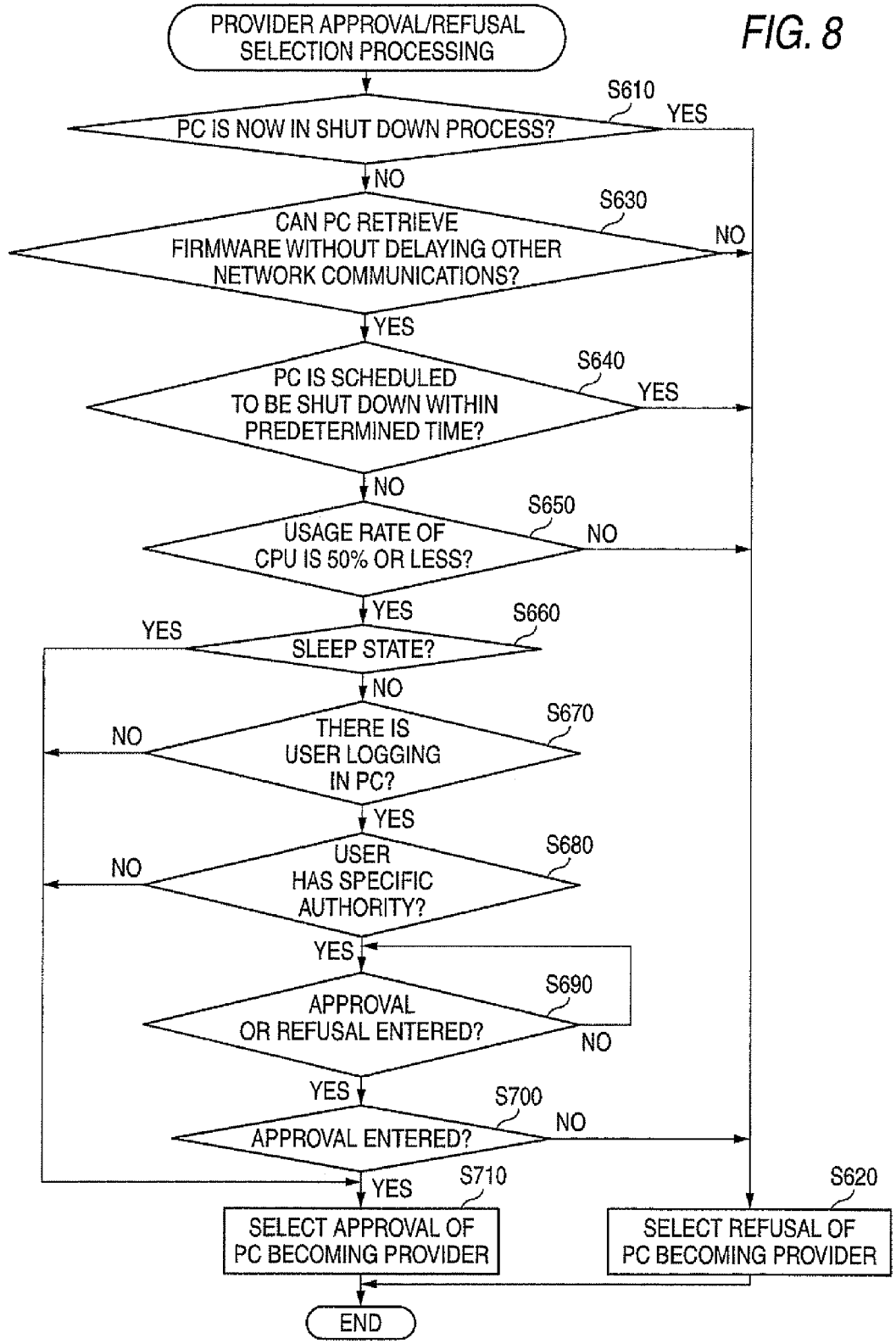
FIG. 8 is a flowchart of provider approval/refusal selection processing executed by a controller of the PC of the first embodiment of the invention.

FIG. 8 is a flowchart to represent provider approval/refusal selection processing executed by the status monitor 11A (strictly, the controller 11 of the PC 1A functioning as the status monitor 11A). This processing is executed as S540 if it is determined at S530 shown in FIG. 7 that a firmware request command has been received.

As shown in FIG. 8, the controller 11 of the PC 1A starts the provider approval/refusal selection processing, first it is determined that the PC 1A is being shut down at present (S610).

If it is determined at S610 that the PC 1A is being shut down at present (YES at S610), refusal of the PC 1A becoming the provider is selected (S620) and the provider approval/refusal selection processing shown in FIG. 8 is exited.

On the other hand, if it is determined at S610 that the PC 1A is not being shut down (turned on) at present (NO at S610), the process goes to S630. At S630, it is determined whether or not the PC 1A is able to retrieve firmware without delaying other network communications based on the network use state of the PC 1A.

Specifically, at S630, as the use state of the network, the usage rate of the network and the communication speed of the line of the network are examined. For example, if the usage rate of the network is equal to or less than a predetermined value and the communication speed is equal to or greater than 10 [Mbps], it is determined that the PC 1A is able to retrieve firmware without delaying other network communications.

If it is determined at S630 that the PC 1A is not able to retrieve firmware without delaying other network communications (NO at S630), refusal of the PC 1A becoming the provider is selected (S620) and the provider approval/refusal selection processing shown in FIG. 8 is exited.

On the other hand, if it is determined at S630 that the PC 1A is able to retrieve firmware without delaying other network communications (YES at S630), it is determined that whether or not the PC 1A is scheduled to be shut down within a predetermined time (S640).

If it is determined at S640 that the PC 1A is scheduled to be shut down within a predetermined time (YES at S640), refusal of the PC 1A becoming the provider is selected (S620) and the provider approval/refusal selection processing shown in FIG. 8 is exited.

On the other hand, if it is determined at S640 that the PC 1A is not scheduled to be shut down within a predetermined time (NO at S640), whether or not the usage rate of the CPU of the controller 11 is 50% or less is determined (S650).

If it is determined at S650 that the usage rate of the CPU of the controller 11 is more than 50% (NO at S650), refusal of the PC 1A becoming the provider is selected (S620) and the provider approval/refusal selection processing shown in FIG. 8 is exited.

On the other hand, if it is determined at S650 that the usage rate of the CPU of the controller 11 is 50% or less (YES at S650), whether or not the current state of the PC 1A is a sleep state is determined (S660).

If it is determined at S660 that the current state of the PC 1A is a sleep state (YES at S660), approval of the PC 1A becoming the provider is selected (S710) and the provider approval/refusal selection processing shown in FIG. 8 is exited.

On the other hand, if it is determined at S660 that the current state of the PC 1A is not a sleep state (NO at S660), whether or not there is a user logging in the PC 1A is determined (S670).

If it is determined at S670 that there is not a user logging in the PC 1A (NO at S670), approval of the PC 1A becoming the provider is selected (S710) and the provider approval/refusal selection processing shown in FIG. 8 is exited.

On the other hand, if it is determined at S670 that there is a user logging in the PC 1A (YES at S670), whether or not the user logging in the PC 1A has a specific authority is determined (S680).

If it is determined at S680 that the user logging in the PC 1A does not have a specific authority (NO at S680), approval of the PC 1A becoming the provider is selected (S710) and the provider approval/refusal selection processing shown in FIG. 8 is exited.

On the other hand, if it is determined at S680 that the user logging in the PC 1A has a specific authority (YES at S680), a selection dialog for requesting the user to select approval or refusal of the PC 1A becoming the provider is displayed on the display unit 14 of the PC 1A and whether or not the selection result of the user on the selection dialog is input to the PC 1A through the input unit 13 is determined (S690).

S690 is repeated until it is determined that the selection result of the user on the selection dialog is input to the PC 1A through the input unit 13. When it is determined that the selection result of the user is input to the PC 1A (YES at S690), whether or not the input result is selection of approval of the PC 1A becoming the provider is determined (S700).

If it is determined at S700 that the input result is selection of approval of the PC 1A becoming the provider (YES at S700), approval of the PC 1A becoming the provider is selected (S710) and the provider approval/refusal selection processing shown in FIG. 8 is exited.

On the other hand, if it is determined at S700 that the input result is not selection of approval of the PC 1A becoming the provider (NO at S700), refusal of the PC 1A becoming the provider is selected (S620) and the provider approval/refusal selection processing shown in FIG. 8 is exited.

3. Features of Network System According to Embodiment

As described above, according to the embodiment, the printer 2 selects one PC from among the PC 1A to PC 1E as the provider (firmware provider) (S320) and thus if there are a plurality of PCs 1 that can communicate with the printer 2, only one PC communicates with the server 3 at the same time.

Thus, to retrieve firmware from the server 3, a plurality of PCs of PC 1A to PC 1E can be prevented from conducting communication with the server 3 at the same time, so that concentration of access to the server 3 can be suppressed. Therefore, an increase in the network traffic can be suppressed.

In the embodiment, to select one of the PC 1A to PC 1E as the provider, random numbers are generated (S410), whereby one of the PC 1A to PC 1E as the provider is selected at random. That is, in the embodiment, using random numbers, it is made easy to select one of the PC 1B to PC 1E different from the PC 1A previously selected in the provider selection processing.

Thus, a specific PC 1 is prevented from being selected concentratedly as the provider and load is prevented from concentrating on one PC.

The PC 1A to PC 1E of the embodiment can refuse to be selected as the provider by the printer 2 as shown in the provider approval/refusal selection processing in FIG. 8 (S620). Thus, as for PC 1 not fitted for the provider, refusal of the PC 1 becoming the provider is selected, whereby the printer 2 can update firmware using any of the PC 1A to PC 1E fitted for the provider.

Therefore, the firmware can be efficiently updated.

In the embodiment, if the PC 1 is not able to retrieve firmware without delaying other network communications (NO at S630) or if the usage rate of the CPU of the PC 1 is more than 50% (NO at S650), etc., namely, if the PC 1 is not fitted for the provider, the PC 1 is not selected as the provider (S620). Thus, the printer 2 can update firmware from among the PC 1A to PC 1E fitted for the provider.

In the provider approval/refusal selection processing, the communication speed of the line of the network and the usage rate of the network are used as selection conditions as to whether or not PC becomes the provider (S630), so that the communication time of the network required for updating the firmware can be shortened effectively.

Further, in the embodiment, arrangement in which the PC used by the user having a specific authority refuses to become the provider even if any other condition is satisfied is also involved (S680 to S700). According to the processing, the user having a specific authority can refuse to become the provider, so that the user who needs to perform emergency processing can perform the emergency processing without hindrance.

If the response signal transmitted from the PC 1 is a signal representing refusal of the PC 1 becoming the provider (NO at S350), the printer selects one PC among the PC 1A to PC 1E except the PC transmitting the response signal, so that the PC 1 not becoming the provider can be prevented from being again selected.

4. Correspondence Between Invention Specific Items and Embodiment

In the embodiment, the printer 2 corresponds to a peripheral, the storage unit 4 of the server 3 corresponds to a firmware storage unit, and the processing at S410 and S420 corresponds to a selection unit.

The processing at S330 corresponds to a providing request transmission unit, the processing at S580 corresponds to a firmware acquisition unit, and the processing at S590 corresponds to a firmware providing unit.

The processing at S370 corresponds to an update unit, the processing at S610 to S710 corresponds to a provider selection unit, and the processing at S560 corresponds to a notification transmission unit.

Second Embodiment

In the first embodiment described above, random numbers are used to select any of the PC 1A to PC 1E becoming the provider. In a second embodiment, however, the PC of PC 1A to PC 1E involving the longest access time to a printer 2 is selected as a provider as shown in FIG. 9.

Provider selection processing of the embodiment will be discussed with FIG. 9. FIG. 9 is a flowchart of the provider selection processing of the second embodiment of the invention. Components identical with those of the first embodiment are denoted by the same reference numerals in the second embodiment and steps identical with those of the first embodiment are denoted by the same step numbers in the second embodiment and therefore they will not be discussed again in detail. This also applies to third to seventh embodiments described later in a similar manner.

Figure 9:
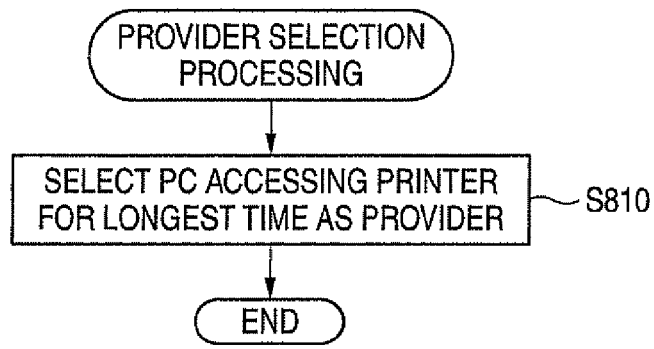
FIG. 9 is a flowchart of provider selection processing of a second embodiment of the invention.

When S310 of the update processing shown in FIG. 5 terminates, if a control unit 21 starts provider selection processing, as shown in FIG. 9, PC 1 having the longest time from the first access time to the last access time is selected from among PC 1A to PC 1E registered in the monitor table (FIG. 2) (S810) and the provider selection processing is exited.

Specifically, the first access time and the last access time of each of the registered PC 1A to PC 1E are stored and the PC involving the largest difference between the first and last access times is selected as the provider.

As described above, also in the embodiment, the printer 2 selects one PC as the provider, so that an increase in the network traffic can be suppressed as in the first embodiment.

The PC accessing the printer for the longest time has a high possibility of being capable of stably conducting communications with the printer 2 and thus such a PC is selected as the provider, so that the PC can stably provide firmware for the printer 2.

In the embodiment, the processing at S810 corresponds to a selection unit.

Third Embodiment

As compared with the provider selection processing of the first and second embodiments described above, provider selection processing of a third embodiment of the invention is adapted to select any of PC 1A to PC 1E becoming an provider using the use state of the PC 1A to PC 1E.

Figure 10:
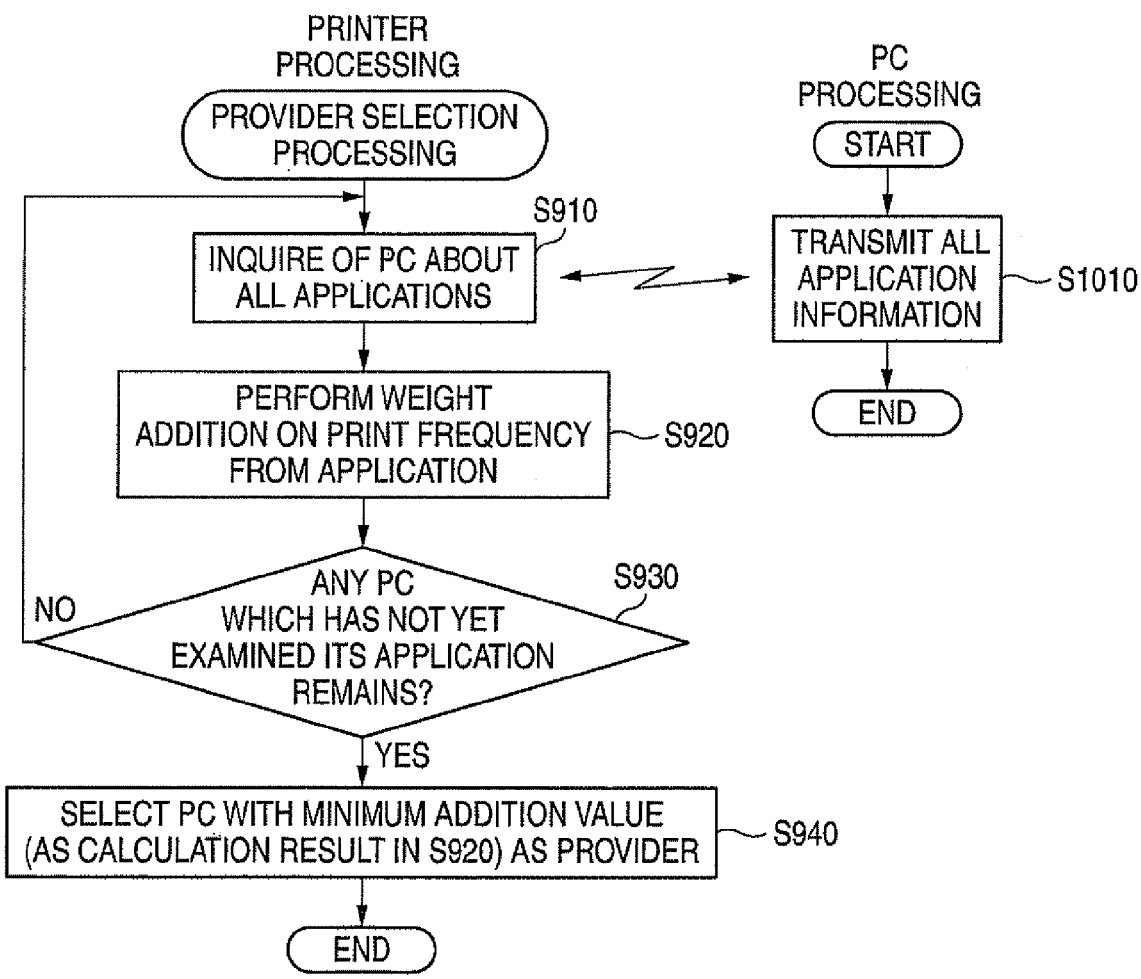
FIG. 10 is a flowchart of processing executed by a controller of a PC and a controller of a printer of a third embodiment of the invention.

The provider selection processing of the embodiment will be discussed with FIG. 10. FIG. 10 is a flowchart of processing executed by a controller 11 of the PC 1A and a controller 21 of a printer 2 of the third embodiment of the invention.

As shown in FIG. 10, when the controller 21 of the printer 2 starts the provider selection processing, first, it inquires of the PC 1A to PC 1E about the descriptions of all applications that the PC 1A to PC 1E have (S910). Then, the PC 1A to PC 1E receiving the inquiry transmit (report) the descriptions of all applications that the PC 1A to PC 1E have to the printer 2 (S1010).

When the descriptions of all applications that the PC 1A to PC 1E have are received at the printer 2, the print frequency of each application is examined based on the reception result and weight addition is performed on the print frequency (S920).

Specifically, the types of applications assumed to involve a high print frequency are previously stored in the printer 2 and the printer 2 determines whether or not the type of application that the PC 1A has matches the stored type of application based on the application descriptions retrieved from the PC 1A, for example.

If they match, weight addition is performed on the application as the application involving a high print frequency; if they do not match, nothing is added.

Such processing is repeated for all applications retrieved from the PC 1A.

Subsequently, at S930, it is determined whether or not any PC (PC 1A to PC 1E) which has not yet examined its application remains. If it is determined at S930 that at least one PC (PC 1A to PC 1E) which is not examined its application remains (NO at S930), the process returns to S910; if it is determined at S930 that no PC which is not examined its application remains, the process goes to S940.

At S940, the PC 1A with the calculation result (addition value) at S920 being the minimum is selected as the provider and the provider selection processing is exited. That is, at S940, the PC of the PC 1A to PC 1E least using the printer 2 is selected as the provider.

As described above, also in the embodiment, the printer 2 selects one PC as the provider, so that an increase in the network traffic can be suppressed as in the first and second embodiments.

In the embodiment, the PC becoming the provider is selected based on the use state (print frequency of application) of the PC 1A to PC 1E, so that selecting of PC not fitted for the provider can be prevented.

In the embodiment, the processing at S910 to S940 corresponds to a selection unit.

Fourth Embodiment

As compared with the provider selection processing of the first to third embodiments described above, provider selection processing of a fourth embodiment of the invention is adapted to select any of PC 1A to PC 1E becoming an provider by the user of a printer 2.

Figure 11:
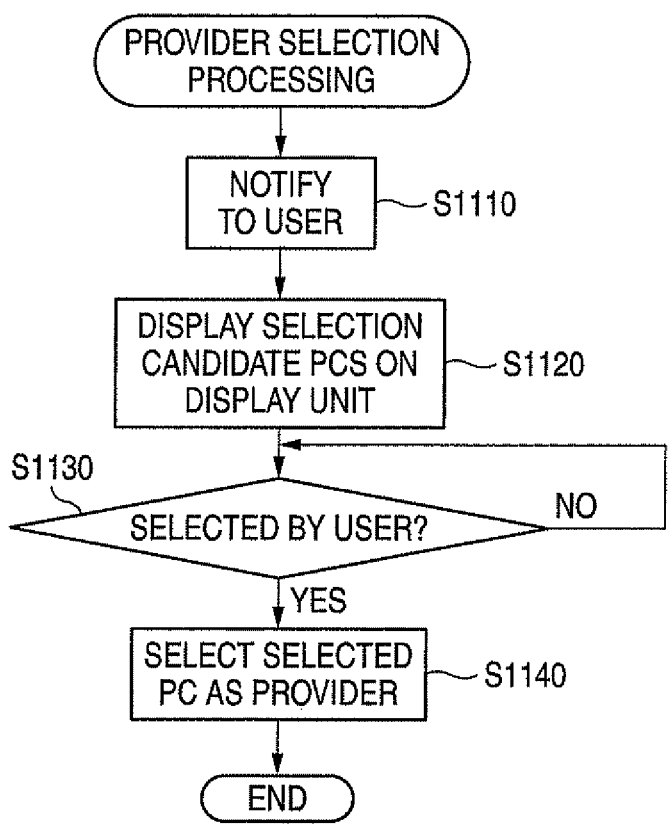
FIG. 11 is a flowchart of provider selection processing of a fourth embodiment of the invention.

The provider selection processing of the embodiment will be discussed with FIG. 11. FIG. 11 is a flowchart of the provider selection processing of the fourth embodiment of the invention.

As shown in FIG. 11, when a controller 21 of the printer 2 starts the provider selection processing, first, notification processing of causing a notification unit 27 to produce light and a sound is performed (S1110) and a selection dialog for enabling the user to select any of the PC 1A to 1E registered in the monitor table (FIG. 2) is displayed on a display unit 24 (S1120).

At S1130, whether or not the user selects one of the PC 1A to 1E displayed on the selection dialog of the display unit 24 is determined (S1130). S1130 is repeated until it is determined that the user selects one from among the PC 1A to 1E.

If it is determined at S1130 that the user selects one from among the PC 1A to 1E (YES at S1130), the PC 1 selected by the user is selected as the provider (S1140) and the provider selection processing is exited.

As described above, also in the embodiment, the printer 2 selects one PC as the provider, so that an increase in the network traffic can be suppressed as in the first to third embodiments.

In the embodiment, the processing at S1110 to S1140 corresponds to a selection unit.

Fifth Embodiment

As compared with the first to fourth embodiments described above, in a fifth embodiment of the invention, if PC 1A to PC 1E whose use state satisfies a predetermined condition are extracted as provider selection candidates and one PC is selected from among the extracted PCs 1.

Specifically, a controller 11 of the PC 1A of the embodiment performs use state examination processing of examining the use state of the PC 1A and transmits the examination result (score described later) to a printer 2.

Whenever the printer 2 receives the score transmitted from the PC 1A, the printer 2 stores the score in a storage unit 22. The printer 2 extracts provider selection candidates from among the PC 1A to PC 1E based on the scores and selects one PC from among the extracted selection candidates.

The use state examination processing executed by the controller 11 of the PC 1A of the embodiment and update processing executed by a controller 21 of the printer 2 will be discussed with FIGS. 12 and 13.

1. Use State Examination Processing

Figure 12:
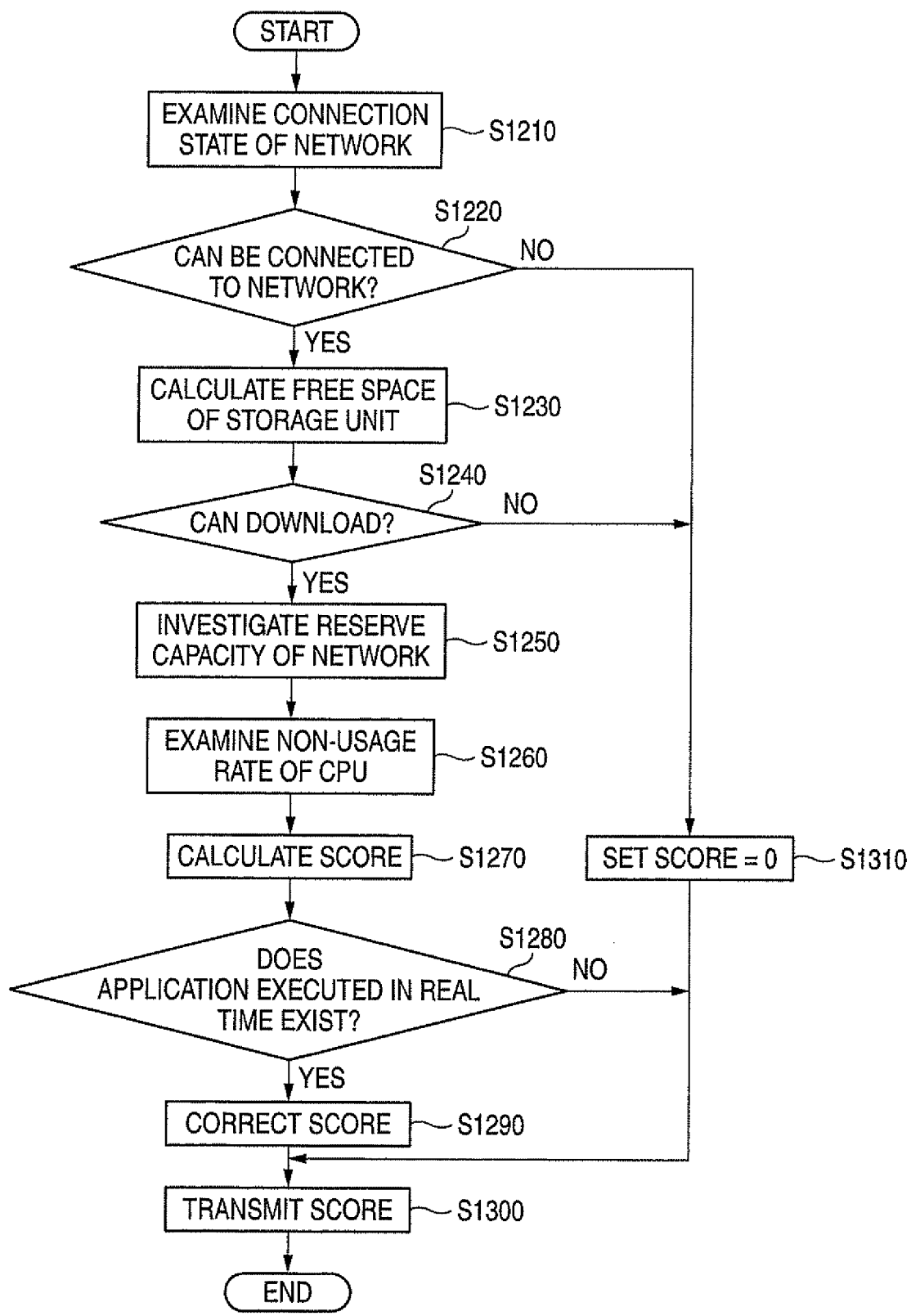
FIG. 12 is a flowchart of use state examination processing executed by a controller of a PC of a fifth embodiment of the invention.

FIG. 12 is a flowchart of the use state examination processing executed by the controller 11 of the PC 1A of the embodiment. This processing is executed at regular time intervals (in the embodiment, every hour). As shown in FIG. 12, when the controller 11 of the PC 1A starts the use state examination processing, first, it is checked whether or not the PC 1A can be connected to a network (S1210).

Specifically, at S1210, it is checked whether or not the PC 1A is connected to a WAN 7 and it is checked whether or not a port of the PC 1A can communicate with WAN 7 by using the port of the PC 1A (for example, a state in which the port is not closed by a fire wall).

Subsequently, at S1220, whether or not the PC 1A can be connected to the network is determined based on the examination result at S1210. Specifically, if the PC 1A is connected to the WAN 7 and the port of the PC 1A can be used, it is determined that the PC 1A can be connected to the network.

If it is determined at S1220 that the PC 1A cannot be connected to the network (NO at S1220), the score representing the use state of the PC 1A is set to "0" (S1310). Subsequently, at S1300, the score set at S1310 is transmitted to the printer 2 and the use state examination processing is terminated.

On the other hand, if it is determined at S1220 that the PC 1A can be connected to the network (YES at S1220), the free space of the storage unit 12 of the PC 1A is calculated (S1230) and whether or not the PC 1A can download firmware is determined based on the calculation result (the free space of the storage unit 12) (S1240).

Specifically, at S1240, if the free space of the storage unit 12 is enough space to store firmware, it is determined that the PC 1A can download firmware.

If it is determined at S1240 that the PC 1A cannot download firmware (NO at S1240), the score is set to "0" (S1310) and the score is transmitted to the printer 2 (S1300).

On the other hand, if it is determined at S1240 that the PC 1A can download firmware (YES at S1240), the reserve capacity of the network is investigated (S1250). Specifically, at S1250, the product of the non-usage rate of the network and the communication speed of the line of the network is calculated.

At S1260, the non-usage rate of the control unit 11 (specifically, CPU) is calculated and subsequently the calculation result at S1250 and the calculation result at S1260 are added and the addition result is set as the score (S1270).

Next, at S1280, it is determined whether or not any application that requires real-time processing (for example, a music player or an animation player) is executing on PC 1A.

If it is determined at S1280 that an application that requires real-time processing does not exist (NO at S1280), the score set at S1270 is transmitted to the printer 2 (S1300).

On the other hand, if it is determined at S1280 that an application executed in real time exists (YES at S1280), the score set at S1270 is downward corrected (S1290) and the downward corrected score is transmitted to the printer 2 (S1300).

2. Update Processing

Figure 13:
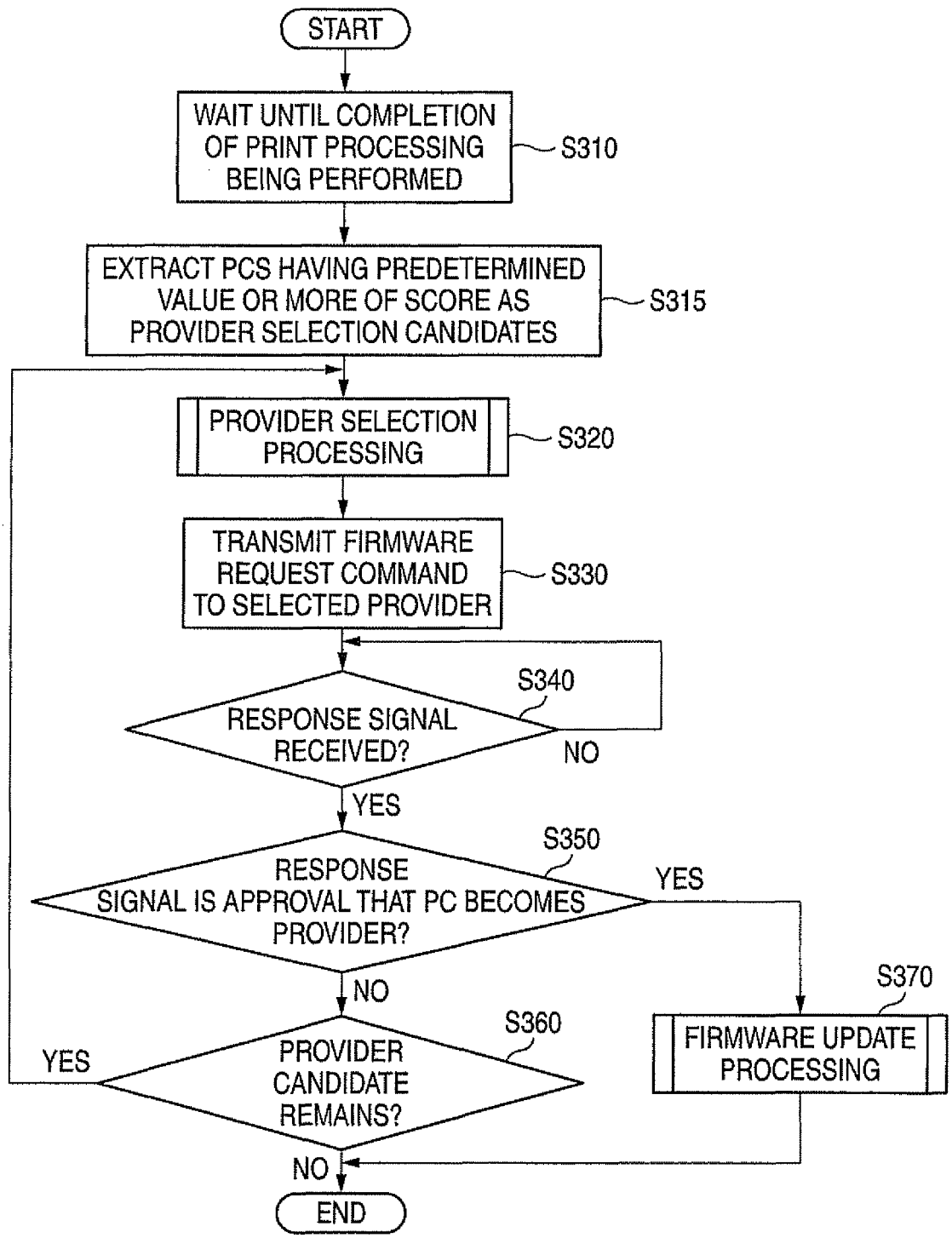
FIG. 13 is a flowchart of update processing of the fifth embodiment of the invention.

FIG. 13 is a flowchart of update processing executed by the controller 21 of the printer 2 of the embodiment of the invention. This processing is executed at regular time intervals (in the embodiment, once a month).

As shown in FIG. 13, first, if a print processing is under progress, the controller 21 halts the update processing until the current print processing is completed (S310).

When the current print processing is completed, the controller 21 extracts PCs of the PC 1A to PC 1E having score (namely, the use state of the PC 1A to PC 1E) of a predetermined value or more, based on the scores stored in the storage section 22, as provider selection candidates (S315).

At S320, provider selection processing of selecting one PC from among the PCs extracted at S315 as the PC becoming the provider is performed. Details of the provider selection processing executed in the embodiment may be any of the first to fourth embodiments described above (FIGS. 6 and 9 to 11).

3. Features of Network System According to the Embodiment

As described above, also in the embodiment, the printer 2 selects one PC as the provider, so that an increase in the network traffic can be suppressed as in the first to fourth embodiments.

In the embodiment, if the value of the score transmitted from the PC 1A to PC 1E is the predetermined value or more, the PC(s) corresponding to the score are extracted as the provider selection candidate(s) (S315).

That is, in the embodiment, the PC (PC 1A to PC 1E) whose use state satisfies a predetermined condition is extracted as the provider selection candidate and one PC is selected from among the extracted PCs. Thus, only the PCs (PC 1A to PC 1E) fitted for the provider can be narrowed down as the provider selection candidates.

The technique of the score calculation is not limited to the method described above; for example, a change can be made in such a manner that the score is incremented for the PC that the user does not log in, the PC wherein a screen saver starts, etc. To transmit the score, at S315, the printer may request the PC to transmit the score and the PC may respond to the request with the score.

In the embodiment, the processing at S315 and S320 corresponds to a selection unit.

Sixth Embodiment

As compared with the first to fifth embodiments described above, provider selection processing of a fourth embodiment of the invention is adapted to select any of PC 1A to PC 1E becoming an provider based on a score transmitted from PC 1A to PC 1E (the use state of the PC 1A to PC 1E).

Figure 14:
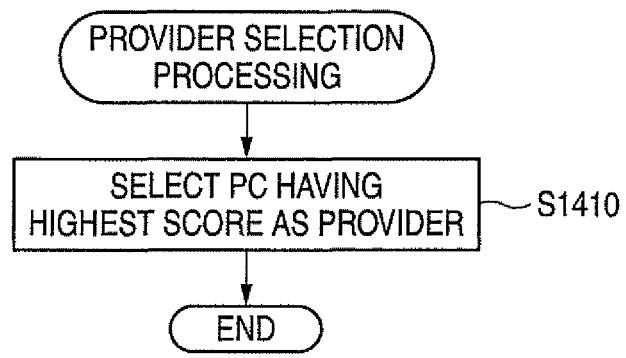
FIG. 14 is a flowchart of provider selection processing of a sixth embodiment of the invention.

The provider selection processing of the embodiment will be discussed with FIG. 14. FIG. 14 is a flowchart of the provider selection processing of the sixth embodiment of the invention.

As shown in FIG. 14, when a controller 21 of a printer 2 starts the provider selection processing, the PC (the PC 1A to PC 1E) having the highest score is selected as the PC becoming the provider from among the PCs extracted as the provider selection candidates at S315 (see FIG. 13) based on the scores stored in a storage unit 22 of the printer 2 (S1410) and the provider selection processing is terminated.

As described above, also in the embodiment, the printer 2 selects one PC as the provider, so that an increase in the network traffic can be suppressed as in the first to fifth embodiments.

In the embodiment, the processing at S315 and S1410 corresponds to a selection unit.

Seventh Embodiment

In the sixth embodiment described above, the PC becoming the provider (PC 1A to PC 1E) is selected based on the scores transmitted from the PC 1A to PC 1E (the use state of the PC 1A to PC 1E). A seventh embodiment of the invention is adapted to select any of the PC 1A to PC 1E becoming an provider using not only a score, but also a random number.

Figure 15:
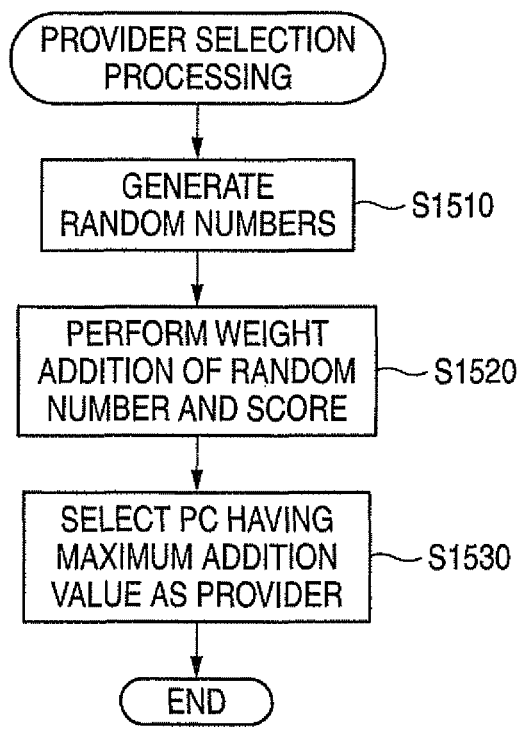
FIG. 15 is a flowchart of provider selection processing of a seventh embodiment of the invention.

The provider selection processing of the embodiment will be discussed with FIG. 15. FIG. 15 is a flowchart of the provider selection processing of the seventh embodiment of the invention.

As shown in FIG. 15, when a controller 21 of a printer 2 starts the provider selection processing, a random number is generated for the each PCs (the PC 1A to PC 1E) extracted as the provider selection candidates at S315 (S1510).

Subsequently, at S1520, weight addition of the random number generated for each PC (the PC 1A to PC 1E) at S1510 and the score of the corresponding PC (the PC 1A to PC 1E) is performed. At S1530, the PC (the PC 1A to PC 1E) having the maximum addition value is selected as the PC becoming the provider and the provider selection processing is terminated.

As described above, also in the embodiment, the printer 2 selects one PC as the provider, so that an increase in the network traffic can be suppressed as in the first to sixth embodiments.

In the embodiment, the processing at S315 and S1510 to S1530 corresponds to a selection unit.

Since the weight is added to the score of each PC using the random number, there is an effect to prevent a certain PC from being frequently selected as the provider.

Other Embodiments

The invention may be the invention matching the gift of the invention according to Claims and is not limited to the embodiments described above.

In the description of the embodiments, as the peripheral, the printer 2 is taken as an example, but the invention is not limited to it. The peripheral may be any if it is a device that can communicate with any other device through the network and needs update of firmware. For example, the peripheral may be a hard disk drive, a multiple function device, a FAX machine, etc., that can be connected through the network.

What is claimed is:

1. A network system comprising a server, a plurality of computers that can communicate with the server through a first network, and a peripheral that can communicate with the plurality of computers through a second network,
wherein the server comprises a firmware storage unit which stores a firmware,
wherein the peripheral comprises a first processor comprising hardware and first memory storing computer readable instructions causing, when executed by the first processor, the peripheral to:
select one computer from among the plurality of computers;
communicate with the selected computer, and transmit a request for providing the firmware to the selected computer; and
update the firmware of the peripheral,
wherein each of the plurality of computers comprises a second processor comprising hardware and second memory storing computer readable instruction causing, when executed by the second processor, the computer to:
retrieve the firmware stored in the firmware storage unit of the server by communicating with the server upon reception of the providing request from the peripheral;
provide the retrieved firmware by communicating with the peripheral transmitting the providing request;
select whether or not the computer becomes a firmware provider for the peripheral transmitting the providing request upon receipt of the providing request; and
notify the peripheral transmitting the providing request that firmware cannot be provided if the computer is not selected to become a firmware provider,
wherein the firmware of the peripheral is updated to the provided firmware, and
wherein if the computer is selected to become the firmware provider, the computer communicates with the server, and
wherein if the computer is not selected to become a firmware provider, the computer does not communicate with the server.

2. The network system according to claim 1, wherein
the first processor executes the instructions stored in the first memory causing the peripheral to communicate with the plurality of computers, and to retrieve a use state of each of the plurality of computers from the communicating computer, and
to select one computer based on the retrieved use state of the computers.

3. The network system according to claim 2, wherein
the computers whose retrieved use state satisfy a predetermined condition are extracted as selection candidates and one computer from among the extracted computers is selected.

4. The network system according to claim 1, wherein one computer different from the previously selected computer is selected.

5. The network system according to claim 1, wherein upon reception of the providing request, a use state of the computer is examined and whether or not the computer becomes the firmware provider based on the examination result is selected.

6. The network system according to claim 5, wherein a state of the first network used by the computer is examined as the use state of the computer.

7. The network system according to claim 1, wherein upon reception of notification, one computer is selected from among the computers except the computer transmitting the notification.

8. The network system according to claim 1,
wherein one computer is randomly selected from among the plurality of computers.

* * * * *